United States Patent

[19]

Muser

[11] Patent Number: 5,921,625
[45] Date of Patent: *Jul. 13, 1999

[54] MOUNTING STRUCTURE FOR CYCLE SEAT

[75] Inventor: Paul Muser, Oakville, Canada

[73] Assignee: Supima Holdings Inc., Oakville, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/811,685

[22] Filed: Mar. 5, 1997

[51] Int. Cl.$^6$ ................................ B62J 1/00; B62J 1/04; B62J 1/08
[52] U.S. Cl. ............................ 297/215.15; 297/215.13; 297/313; 403/53; 403/91
[58] Field of Search ................................ 403/53, 57, 58, 403/163, 164, 97, 91; 297/195.1, 215.13, 215.15, 313, 314; 248/608, 609

[56] References Cited

U.S. PATENT DOCUMENTS

| | | |
|---|---|---|
| 588,039 | 8/1897 | Upson et al. . |
| 604,347 | 5/1898 | Bray . |
| 2,303,568 | 12/1942 | McWhorter et al. . |
| 2,476,226 | 7/1949 | Schwinn . |
| 2,502,925 | 4/1950 | Case ........................................... 403/58 |
| 2,532,574 | 12/1950 | Schwinn ................................ 297/195.1 |
| 3,875,610 | 4/1975 | Wubbe et al. . |
| 4,108,462 | 8/1978 | Martin ................................ 297/215.15 |
| 4,387,925 | 6/1983 | Barker et al. . |
| 4,877,286 | 10/1989 | Hobson et al. ...................... 297/215.13 |
| 5,074,618 | 12/1991 | Ballard . |
| 5,297,846 | 3/1994 | Rafter . |
| 5,330,283 | 7/1994 | Ballard ................................ 297/195.1 |
| 5,427,208 | 6/1995 | Motobu et al. . |
| 5,489,139 | 2/1996 | McFarland . |

FOREIGN PATENT DOCUMENTS

| | | | |
|---|---|---|---|
| 2491429 | 4/1982 | France ............................. 297/215.13 |
| 2675455 | 10/1992 | France ............................. 297/215.13 |
| 738672 | 8/1943 | Germany .......................... 297/195.1 |
| 4104 | 7/1898 | United Kingdom .................. 403/110 |

OTHER PUBLICATIONS

Promotional Leaflet from ABS Sports, Inc. re a Dual Action Seat.

*Primary Examiner*—Peter M. Cuomo
*Assistant Examiner*—Anthony D. Barfield

[57] ABSTRACT

A cycle seat is mounted to a cycle frame so that the seat will rotate in a horizontally-inclined plane on an upwardly-extending axis. The seat extends transversely on opposite sides of the axis of rotation and has a lobed structure in which a gently-rounded front is disposed between two rearwardly-extending wing-like portions. Structure is also provided to adjust the vertical inclination of the axis of rotation so as to vary the attitude of the seat relative to the cycle frame. The seat and associated mount allow the rider to sit more naturally, more comfortably, for longer periods of time.

4 Claims, 5 Drawing Sheets

MOUNTING STRUCTURE FOR CYCLE SEAT

FIELD OF THE INVENTION

This invention relates to a mounting structure for attaching a cycle seat to the cycle frame.

BACKGROUND OF THE INVENTION

A great number of seats have been developed, particularly for cyclists, which are intended to improve the comfort of the rider. Much attention has been devoted to improving the cushioning or resiliency of the seat by providing an improved suspension associated with the seat or a more forgiving padding in the seat itself.

To a large extent, a cyclist's discomfort arises because the cyclist is not static and the buttocks are constantly moving relative to the seat. This problem is partly addressed in prior art devices where the seat is made in two portions which are independently movable, each portion being adapted to alternately support one of the buttocks. An example of such a structure is shown in U.S. Pat. No. 604,347, where the seat portions are each mounted to a support which is horizontally disposed in normal use and the seat portions alternately rotate in a vertical plane about the support when a rider is pedalling. Such seats are nevertheless unsatisfactory unless they can be customized to an exacting shape which conforms to the rider's anatomy.

Some effort has been made in U.S. Pat. No. 4,387,925 to provide such a seat structure in which the seat portions are shaped to alternately give support to the rider's buttock in a concave portion and to the rider's upper leg in a convex portion. While said seat structure does not give any support during weight transfer as the rider pedals, it is a marked improvement over the seat structure shown in U.S. Pat. No. 588,039 where a pair of seat cups are horizontally disposed for rotation in a horizontal plane about respective vertical mounts secured to a horizontally-arranged table which likewise is rotatable in a horizontal plane. The only consideration given to the rider's shifting weight during pedalling is a hinged connection between the seat cups and their respective vertical mounts. Again, there is no continuous support during weight transfer of the rider.

An object of this invention is to provide an improved mounting structure for attaching the seat to the cycle frame in which any relative motion between the rider and the seat is minimized so that the rider will be more comfortable and safe from injury.

SUMMARY OF THE INVENTION

In accordance with this invention, there is provided a mounting structure for a cycle seat whereby the seat is rotatably mounted to a cycle frame for rotation in a horizontally inclined plane about an upwardly extending axis. Preferably, the seat, which is coupled to a cycle frame using such a mounting structure, extends transversely on opposite sides of the axis of rotation and has a deltoid configuration characterized by a pair of rearwardly-extending lobes, and by a gently rounded front disposed between the lobes.

Most preferably, a jointed structure is provided to adjust the vertical inclination of the upwardly extending axis so as to vary the attitude of the seat relative to the cycle frame and suit the rider's requirements.

In accordance with another aspect of this invention, a seat is cantilevered to a seat post having a transversely extending upper termination whereby the horizontal inclination of the seat to the seat post can be varied both statically and dynamically. Preferably, a high-friction resilient damper is disposed on the transversely extending termination, the damper being adapted to flex angularly in response to a load applied to the cycle seat.

BRIEF DESCRIPTION OF THE DRAWINGS

In order that the invention may be more fully understood, several embodiments of the invention are described below with reference to the accompanying drawings, in which.

DESCRIPTION OF PREFERRED EMBODIMENT

Figure 1:
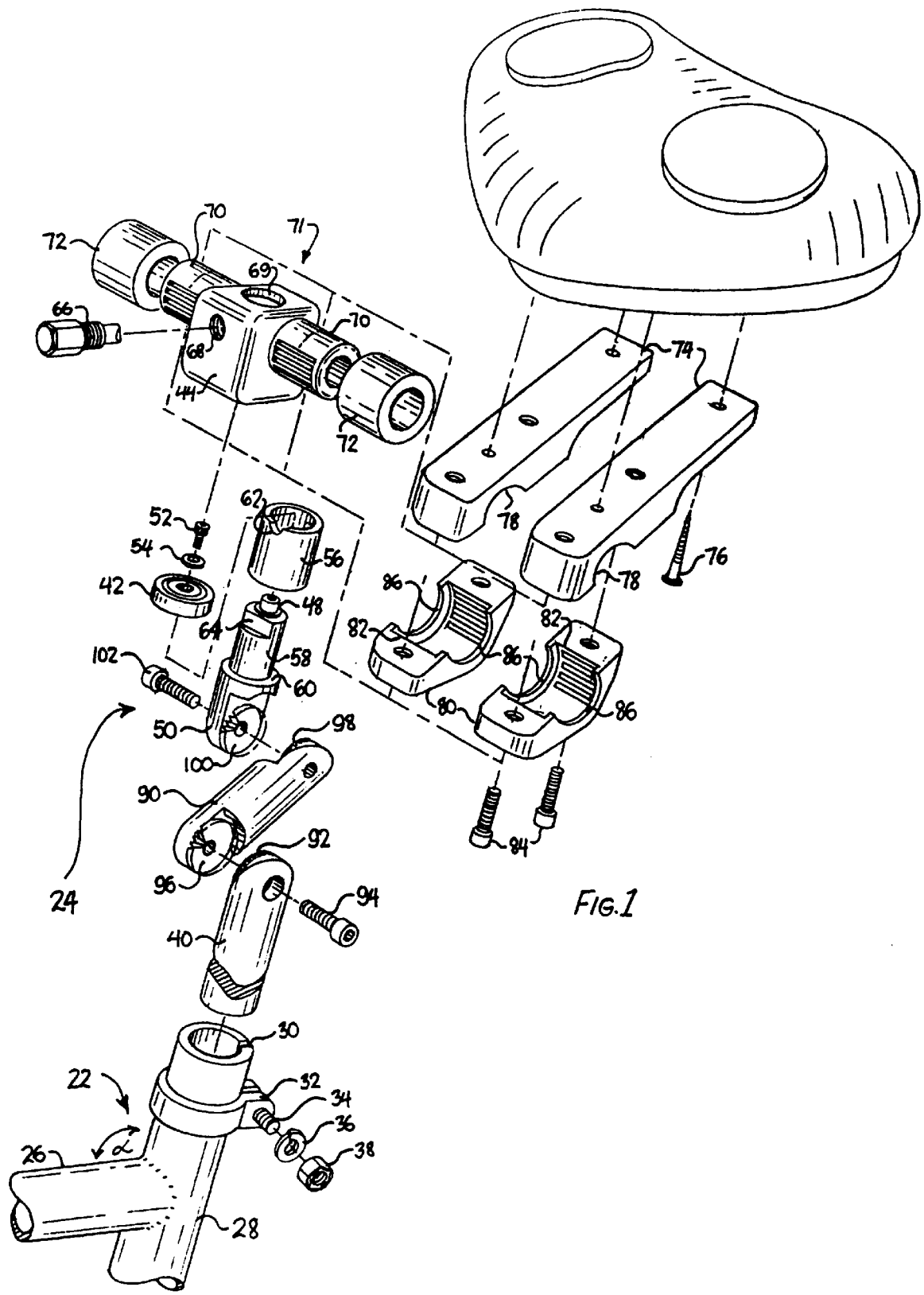
FIG. 1 is a perspective exploded view of a mounting structure for coupling a seat to a cycle frame in accordance with the invention.

A seat made in accordance with the invention is generally indicated in FIG. 1 by numeral 20 and is constructed from specially selected materials, including a seat cover characterized by a plurality of outwardly extending tapered columns made from a resilient material, mounted to a supporting base and having a cushioning bladder therebetween. The construction of the seat does not itself form part of this invention and is more fully described elsewhere. However, the shape of the seat has been specially selected for this invention and it is more fully described further below.

The seat 20 is coupled to a conventional cycle frame 22 by a mounting structure made in accordance with the invention and generally indicated by numeral 24.

The cycle frame 22 typically includes a cross-bar 26 which is horizontal or nearly horizontal and an upwardly extending hollow shaft 28 which extends rearwardly and forms an included angle $\alpha$ with the horizontal which is generally between 72° and 75°. The upper extremity of the hollow shaft 28 has a slit 30 so that minor adjustments in the diameter of the sleeve may be made by tightening a clamp 32 around the shaft 28 using a threaded bolt 34, lock washer 36 and nut 38.

A seat post 40 is releasably retained in the shaft 28 with the clamp 32. The seat post 40 has an outside diameter which is substantially equal to the nominal internal diameter of the shaft 28 so that it can slide inside the shaft and be retained in the shaft at a height selected to space the seat 20 from the frame 22 in accordance with the rider's requirements.

Figure 2:
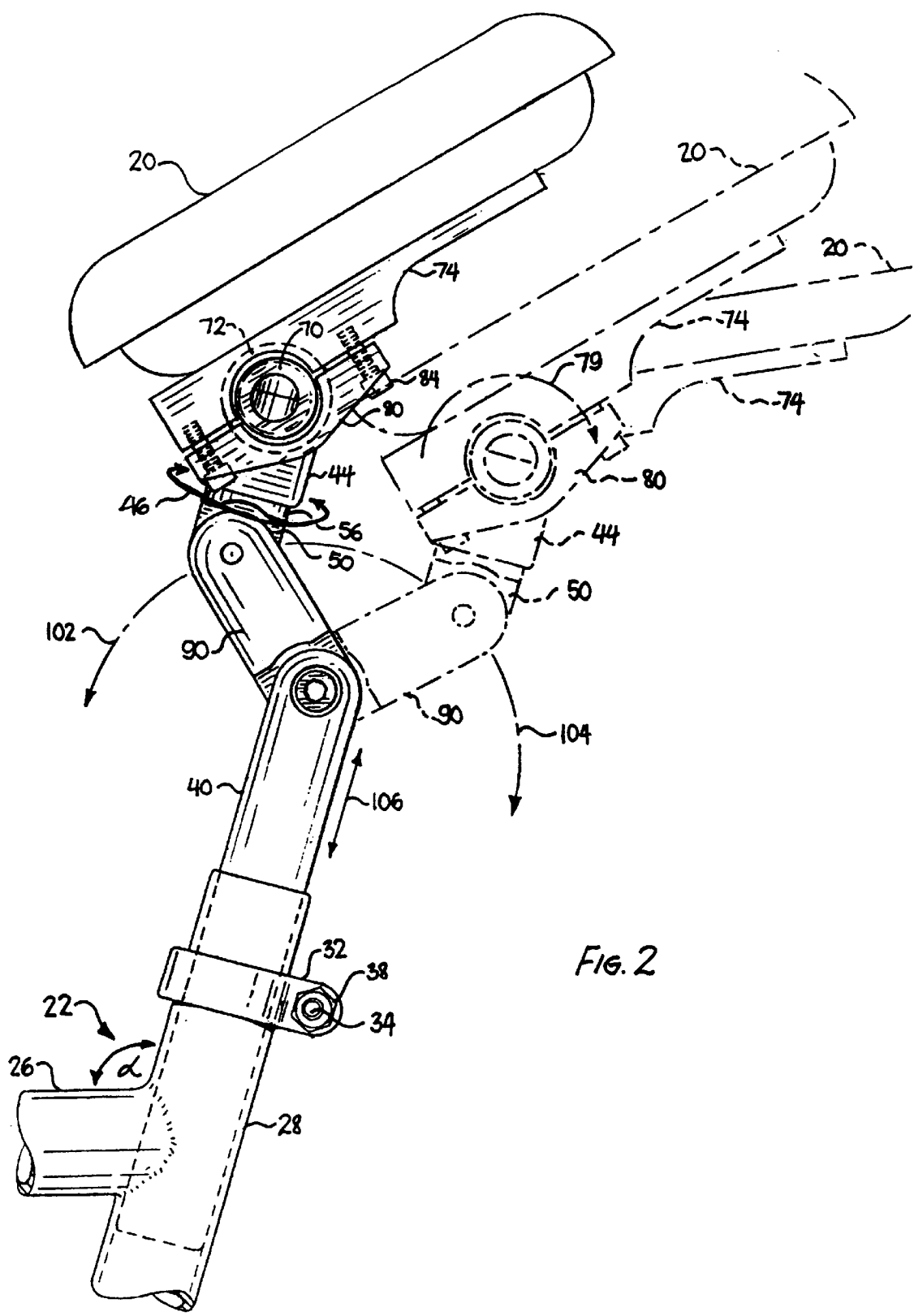
FIG. 2 is a side elevation view of the mounting structure shown in FIG. 1.

In accordance with this invention, the seat post 40 incorporates a rotary bearing 42 inside a housing 44 whereby the seat 20 is adapted to rotate relative to the cycle frame 22, the plane of rotation indicated by arrow 46 in FIG. 2 being inclined to the horizontal about an upwardly extending axis which, in this case, has been adjusted to be parallel to the shaft 28.

In the embodiment of FIG. 1, the rotary bearing 42 is in the form of a ball bearing of which the inner race is mounted to a bearing post 48 at the free end of an upper seat post extension 50, the bearing post 48 having an internal thread adapted to receive a screw 52 disposed over a washer 54. The rotary bearing 42 is supported on a cylindrical collar 56 which surrounds a reduced diameter portion 58 of the upper seat post extension 50 and rests on a shoulder 60 formed where the reduced diameter portion 58 meets the upper seat post extension 50. The collar 56 has an opening 62 which is at the same height as a flat or planar portion 64 machined into the reduced diameter portion 58. The opening 62 allows a spring-loaded pin within a set screw 66 received in a threaded opening 68 in the side of the housing 44 to bear on the reduced diameter portion 58 during rotation of the bearing 42. The flat 64 serves to orient the seat 20 as it rotates on the bearing 42 as will be explained in more detail further below.

The housing 44 has a large circular opening (not shown) at the bottom which is dimensioned to receive the rotary bearing 42 and the underlying collar 56. A smaller opening 69 at the top of the housing 44 provides access to the screw 52 for releasing the rotary bearing 42.

The housing 44 for the roller bearing 42 has a pair of cylindrical bars 70 extending transversely on opposite sides thereof which, together with the housing, define a T-bar termination 71 for coupling the seat 20 to the seat post. It will be noted that the bars 70 have been hollowed to minimize weight and that their outer surfaces have been machined to produce a toothed or geared surface.

A pair of shock absorbers or dampers 72 in the form of a cylindrical sleeve made of high friction resilient material such as polyurethane and having an internal diameter commensurate with the outer diameter of the bars 70 is provided, and each shock absorber 72 is disposed on the respective bar 70 in a close-fitting relationship such that the shock absorbers and the bars make intimate contact, the polyurethane material being effectively molded in situ to conform to the toothed surface of the associated bar.

The T-bar termination 71 is coupled to the seat 20 through a pair of rails 74 disposed parallel to each other and secured to the underside of the seat by a plurality of screws 76. If desirable, the relative position of the rails 74 can be adjusted to position the seat forward or back, as the case may be. The rails 74 each have a transverse groove 78 formed at one end thereof and having a diameter commensurate with the outer diameter of the shock absorbers 72. The surface of the grooves 78 is also toothed or geared. A pair of pillow blocks 80 each having a similar groove 82 are secured by means of bolts 84 to the rails 74 with the bars 70 of the T-bar termination 71 clamped therebetween.

The grooves 82 formed in the pillow blocks 80 will also have a toothed or geared surface. Where the teeth extend longitudinally (as drawn) along the axis of the groove, it is preferable to provide a transverse wall 86 at each end of the grooves 82 and 78 to thereby contain the associated shock absorber 72. To simplify manufacture, the geared surfaces may be provided on inserts which are made separately and assembled into the grooves, for example, by means of a key and slot coupling.

It will be appreciated that the inclination of the seat 20 relative to the cycle frame 22 may be adjusted to some extent by varying the radial position of the rails 74 and pillow blocks 80 relative to the T-bar termination 71. Such an adjustment in the seat position is illustrated schematically by the ghost outline positions of the seat drawn in FIG. 2 and by directional arrow 79.

The relative change in the position of the seat 20 between the two positions drawn in ghost outline in FIG. 2 may be static as described above, by repositioning the rails 74 on the bars 70 of the T-bar termination. This change in position may also be dynamic and take place while the rider is on the cycle and applying a load to the seat 20.

It will be appreciated that the seat 20 is effectively cantilevered from the end of the rails 74 which is remote from the T-bar termination 71. When the rider goes over rough ground or encounters an obstacle, the load applied to the seat 20 will have an angular component transmitted to the shock absorbers or dampers 72 which will flex angularly in response to the load or torque and will return to a neutral position when the load is released. By virtue of its construction, the dampers 72 are not required to be pre-stressed prior to application of the load and will operate in any direction.

More significant adjustments to the seat position will be realized by associating a number of jointed seat post extensions with the seat post 40. The upper seat post extension 50 has been described above with reference to the rotary bearing 42. An intermediate seat post extension 90 connects the upper seat post extension 50 to the seat post 40 which is inserted by its free end into the cycle frame 22. The end of the seat post 40 remote from the free end has a serrated mating surface 92 on one side thereof which is apertured to receive a threaded fastener 94.

A similar mating surface 96 is formed at one end of the intermediate seat post extension 90 on one side thereof and the serrations on the mating surfaces 92, 96 respectively are engaged so that they nest together in mating relationship. The number of serrations formed on the mating surfaces will determine the radial separation between serrations and the consequent adjustability in the seat post configuration. The mating surface 96 is similarly apertured to receive the threaded fastener 94 which is threaded into the mating surfaces to hold the seat post 40 and the seat post 90 extension in a selected angular relationship.

The intermediate seat post extension 90 has a second mating surface 98 formed at the other end on the opposite side thereof and it is similarly serrated and apertured to mate with a corresponding mating surface 100 formed at the bottom end of the upper seat post extension 50 remote from the bearing post 48. The mating surfaces 98, 100 are held together by a threaded fastener 102 received in threaded apertures formed in both mating surfaces.

The jointed seat post extensions allow the position of the seat 20 to be changed dramatically as will best be seen with reference to FIG. 2 where the intermediate seat post extension 90 is shown in a forward orientation drawn in a solid line and in a rearward orientation drawn in chain-dotted outline. The seat 20 is moved between such forward and rearward orientations by rotating the intermediate seat post extension 90 on the lower joint defined by the mating surfaces 92 and 96 between the intermediate seat post 90 and the seat post 40 in a forward direction as indicated by arrow 102 and in a backward direction as indicated by arrow 104.

The associated forward or backward displacement of the seat will depend on the length of the intermediate post extension 90 and its radial position relative to the seat post 40. Such rotation of the intermediate seat post extension will also bring about a commensurate change in the height of the seat above the cross-bar 26. Such changes in the height of the seat may be compensated by adjusting the relative axial position of the seat post 40 in the shaft 28 as indicated by directional arrow 106.

It will be appreciated that rotation of the seat post extension 90 also brings about a change in the attitude of the seat 20 relative to the cycle frame 22. A preferred seat position illustrated in solid outline in FIG. 2 is maintained by rotating the upper post extension 50 forward on the upper joint defined by the mating surfaces 98, 100 between the upper seat post extension and the intermediate post extension.

Such rotation on the upper joint is essential to fix the vertical inclination of the upwardly-extending axis for rotation of the seat. While angle α of between 72° and 75° corresponding to the angular disposition of the shaft 28 to the cross-bar 26 is preferred, this may be adjusted in accordance with the preference of the rider. Independent adjustments to the attitude of the seat are accomplished, as indicated above, by changing the angular disposition of the rails 74 relative to the bars 70. Such flexibility permits the rider to change his riding position from a forward or racing crouch to a more upright position, without compromising comfort.

Clearly, it may be desirable in some circumstances to take advantage of this feature where there is no rotary bearing or where the rotary bearing is disabled, for example, by activating a lock-out feature provided to prevent rotation of the seat.

It will be appreciated that the shape of the seat 20 has been specially selected to take full advantage of the rotary bearing 42 in the mounting structure 24 for this invention. As can be seen more clearly in FIG. 3, the seat 20 has a generally deltoid shape characterized by two rounded rearwardly-extending wing-like portions or lobes 108 extending transversely on opposite sides of a median 110 defined by the axis of rotation of the seat and by a gently-rounded front 112 (drawn at the top of FIG. 3) disposed between the wing-like portions. Each wing-like portion is asymmetric with respect to the seat post 40 about which the seat rotate;. The result is a seat with an aerodynamic shape which generally resembles a boomerang. The seat is also characterized by curved and rounded portions which, unlike prior art seats, does not have any narrow protruding portions such as a "horn" which could penetrate and harm a rider.

Figure 3:
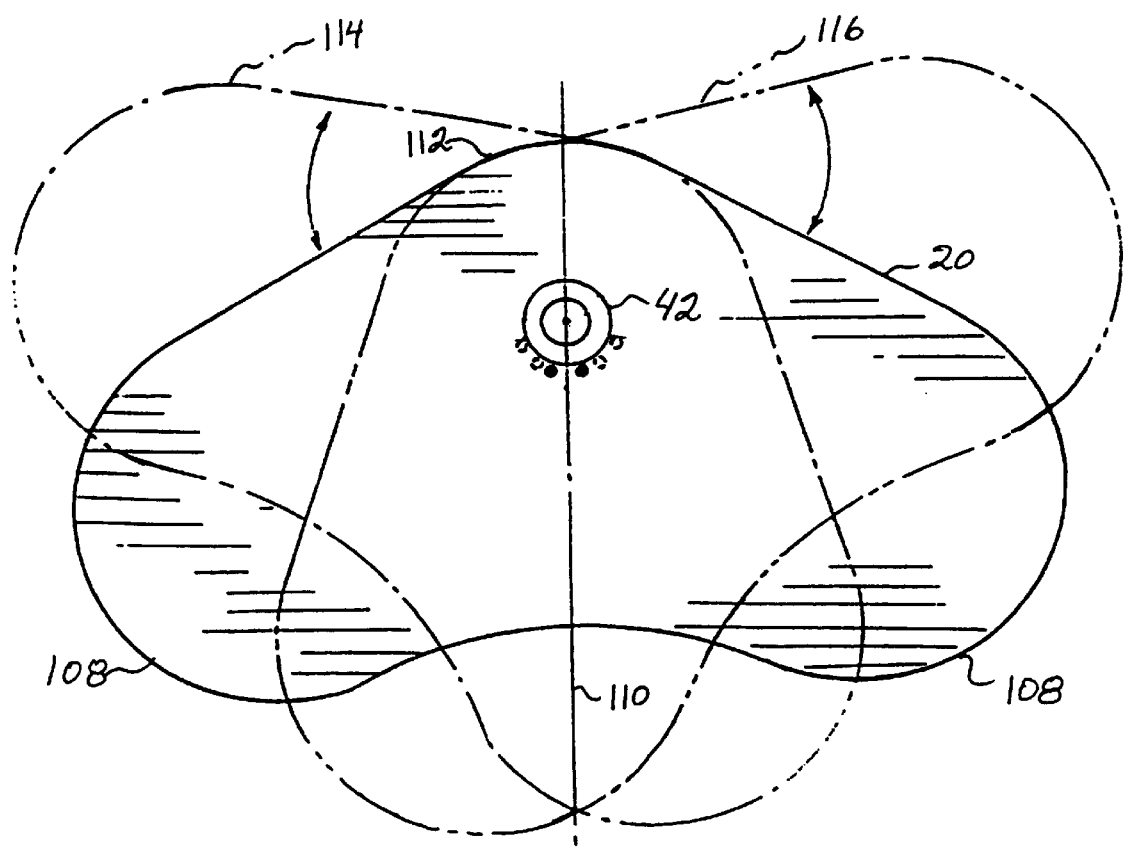
FIG. 3 is a schematic top plan view of a seat associated with the mounting structure according to the invention, showing intermediate positions of the seat in chain-dotted outline.

Upon rotation of the seat 20 on the rotary bearing 42 as will occur when the rider is pedalling, the seat will assume one of the two limiting positions 114, 116 drawn in chain-dotted outline in FIG. 3, depending on whether the rider's right leg is down or the left leg is down. Continued forward rotation of the seat (towards the top of the drawing) may be limited by providing stop means in the rotational path of motion of the seat, if necessary. However, the flat 64 machined into the upper seat post extension 50 will provide sufficient resistance to continued rotation to center the seat in a neutral position (as drawn) before the rider mounts.

In use, it will be understood that the mounting stricture, in accordance with the invention, combines a number of elements which are each adapted to improve the comfort of the rider.

The seat itself provides a broad supporting surface adapted to adequately support one buttock at any one time and yet is arranged to swivel out of the way so as to fully accommodate the rider's leg in a downward pedalling stroke when the rider is effectively standing on one leg. The rotary bearing allows the relative position of the seat to the cycle frame to change during pedalling so that the seat effectively has a dynamic changing shape which varies in accordance with the position of the rider.

When pedal pressure is applied by a downward leg, the rear of that leg abuts against the front of the seat, causing the seat to swivel. The seat not only rotates from front to rear, it tilts downwardly and therefore moves with the leg and does not rub against the leg. At the same time, the opposite leg has bent and the thigh moved upwardly and, on that side of the seat, the seat also has swivelled forwardly and upwardly to provide continuous support to the rider.

The unique configuration results in a seat which tilts both up and down and swivels backwards and forwards simultaneously, thereby infinitely varying the seat shape in relationship to the rider and in response to the rider's movements and anatomical ergonomic requirements. The seat therefore provides a remarkable degree of comfort that was heretofore impossible to achieve.

Moreover, there is no chafing of the inner thighs on the horn section of the seat because there is effectively no horn occupying a fixed space between the legs.

It will be appreciated that a major cause of medically recognized injuries and other ailments, such as permanent or temporary impotence, penile nerve damage, erection loss, subcutaneous tissue damage, numbness, bruising, chafing and pain are associated with uncomfortable, rigid seats which feature a static horn. The area between the legs is sensitive and biologically and psychologically important. Because it is so vulnerable, this feature of the invention offers both peace of mind, increased health, and well-being and safety, particularly in young children who could suffer permanent damage later in life from using a conventional seat. The horn-less feature also eliminates penetrating wounds that may otherwise occur.

Figure 4:
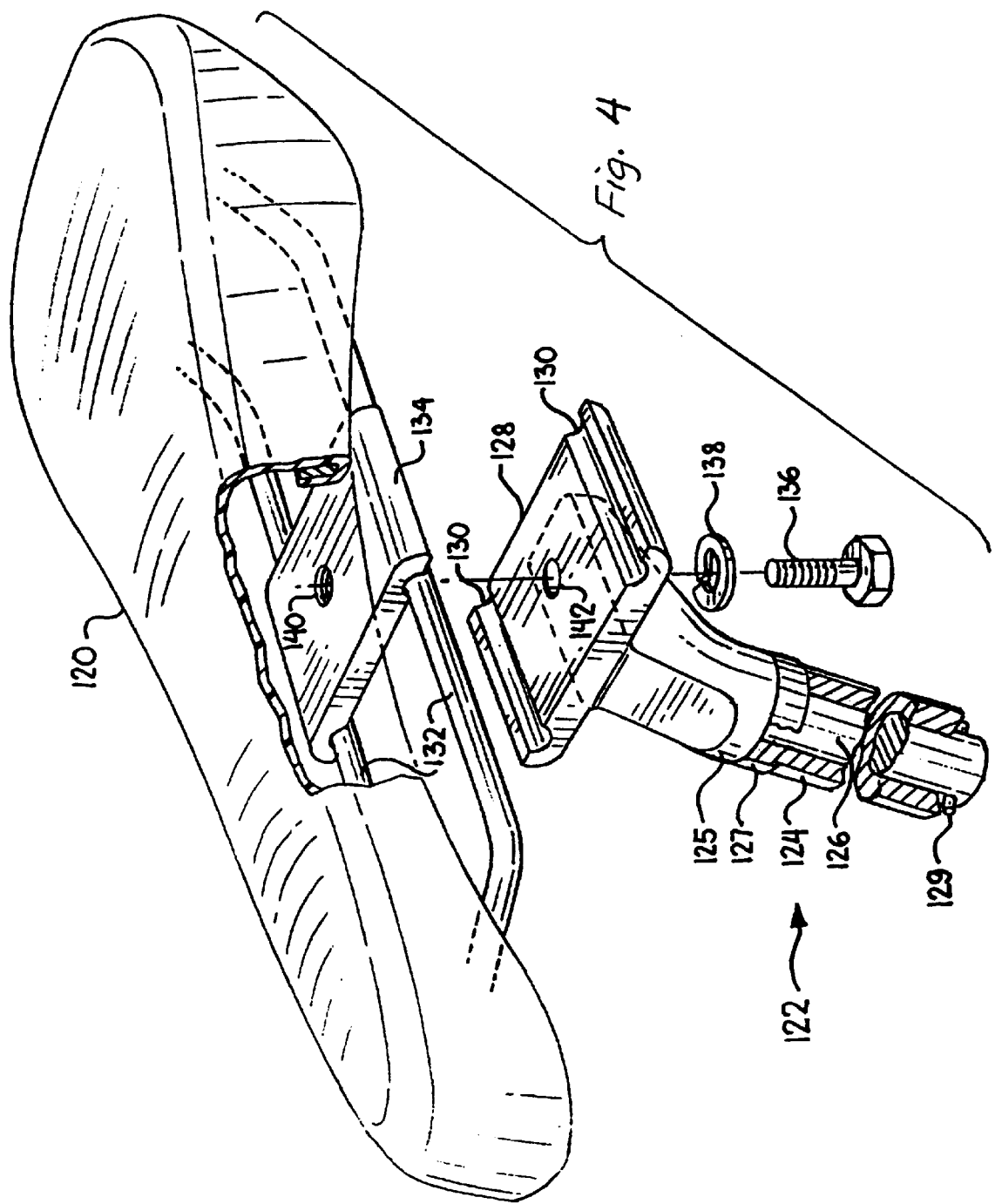
FIG. 4 is a similar view to FIG. 1 showing a first alternative embodiment of the invention in association with a conventional seat.
Figure 5:
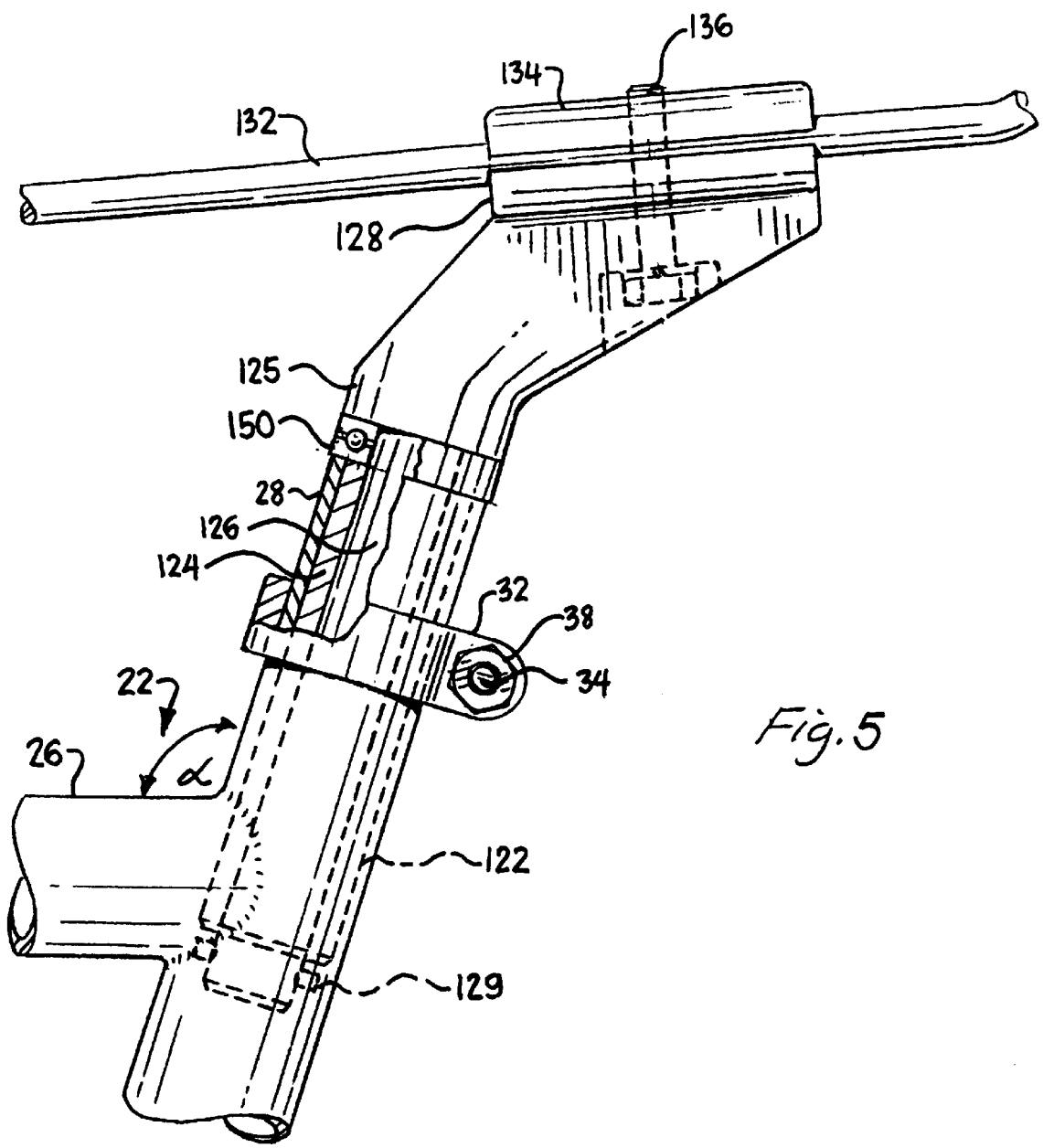
FIG. 5 is a side elevation view, partly sectioned, of a second alternative embodiment of the invention.

Alternative embodiments of the invention are drawn in FIGS. 4 and 5 in which a mounting structure made in accordance with a variant of the invention is shown coupled to a conventional bicycle seat 120. In these embodiments, a seat post 122 is adapted to be slidably received in the shaft 28 of a conventional cycle frame as shown in the embodiment of FIG. 1 at a fixed predetermined angle.

In FIG. 4, the rotary bearing is in the form of a sleeve bearing comprising a tubular outer sleeve 124 rotatably disposed about a tubular inner post 126. An enlarged diameter portion 125 of the inner post 126 overhangs the outer sleeve 124 and defines a stop which limits relative upper movement of the outer sleeve 124 on the inner post. The outer sleeve 124 likewise has an enlarged diameter portion 127 at the upper end thereof which is adapted to overhang the shaft of the cycle frame and thereby limit the lowermost position of the seat post inside the shaft. Once the outer sleeve 124 is assembled on the inner post 126, a drive pin 129 is installed so as to extend transversely on opposite sides of the inner post at the lower end thereof to retain the seat post assembly prior to insertion into the cycle frame. If will, of course, be understood that the length of the drive pin 129 cannot exceed the internal diameter of the shaft 28 forming part of the cycle frame.

At the operatively upper end thereof, the inner post 126 has an integrally formed conventional plate termination 128 having parallel spaced grooves 130 adapted to receive a pair of spaced parallel wire-like rails 132 fixed to the underside of a seat 120 having a conventional shape and in conventional fashion. An upper plate 134 is disposed over the rails 132 and secured to the plate termination 128 below by means of a bolt 136 and associated lockwasher 138 with the rails 132 "sandwiched" in between. The upper plate 134 has a threaded opening 140 to retain the bolt 136, which is received through aperture 142 in the plate termination 128.

In yet another variation of the invention shown in FIG. 5, an annular ball bearing 150 is disposed around the inner post 126 and located between the outer sleeve 124 and the enlarged diameter portion 125 formed at the top end of the inner post. It will be seen that the annular ball bearing 150 has upper and lower ball races of which the outer diameter is commensurate with the outer diameter of the cycle frame shaft 28 so that the ball bearing will rest on the shaft when it is in its lower-most position (as drawn). The embodiment is otherwise similar to that shown in FIG. 4 and like numerals have been used to identify like parts. Like numerals to FIG. 1 have also been used to identify parts of a conventional cycle frame.

The upper and lower races for the annular ball bearing 150 are thus contained between the outer sleeve 124 and the enlarged diameter portion 125 of the inner post 126 to provide a very smooth rotary motion in the seat. As in the embodiment described above with reference to FIGS. 1 to 3, the seat is adapted by the rotary bearing to rotate along a plane which is inclined relative to the horizontal about an upwardly-extending axis which, in this case, corresponds to the angular disposition of the cycle shaft 28 so that during pedalling motion of the rider, the right and left sides of the seat will alternately swivel in and out of supporting engagement with the rider's buttocks.

Conveniently, the seat mounting structure in accordance with the invention may be coupled to a cycle without any substantial modification to the frame thereby maintaining the integrity of the frame so that rigidity and safety are not compromised.

The invention thus allows the rider to sit more naturally, far more comfortably, for longer periods of time on any cycle, whether this is a road bicycle, an exercise cycle, or other cycle.

I claim:

1. Coupling means for coupling a cycle seat to a cycle frame;

the coupling means having a transversely-extending upper termination adapted to be coupled to an upper end of a seat post;

at least one damper comprising a cylindrical sleeve of polyurethane material having a longitudinally-extending opening disposed on said transversely-extending upper termination, with said transversely-extending upper termination received in said opening, and at least one rail adapted to couple the cycle sear to the transversely-extending upper termination, so that the cycle seat is cantilevered to said transversely-extending upper termination, the said at least one rail being fixed at one end to the seat and having clamping means at another end adapted to clamp said at least one rail into engagement with an outer cylindrical surface of said at least one damper onto said transversely-extending upper termination, the clamping means being adapted to confine the damper and to prevent axial displacement and flow of the damper whereby a static position of the cycle seat may be adjusted, said static position being associated with a position of the seat where the seat is at rest in a selected orientation, and wherein said at least one damper will respond to loads applied to the cycle seat so as to vary a dynamic position of the cycle seat, said dynamic position being associated with a position of the seat where the seat has moved from said static position in response to a load, the damper being adapted to flex radially in response to a load and to return to a neutral position when the load is released, said neutral position being associated with a position of the damper where forces transmitted to the polyurethane material have been absorbed and released.

2. Coupling means according to claim 1 having rotary bearing means for dynamic rotation of the cycle seat while a rider is pedalling, the rotary bearing means being adapted for relative rotation to said seat post and disposed between said transversely-extending upper termination and said seat post.

3. Coupling means for coupling a cycle seat cantilevered to a cycle frame, and having an adjustable tilt relative to the cycle frame the coupling means comprising:

a seat post having a free, operatively lower end adapted to be coupled to a cycle frame;

an upper seat post extension having a free upper end adapted to be coupled to the cycle seat;

an intermediate seat post extension connecting the upper seat post extension to the seat post;

a first joint disposed between the intermediate seat post extension and the seat post, the first joint being adapted to vary the position of the cycle seat relative to the cycle frame;

a second joint disposed between the intermediate seat post extension and the upper seat post extension, the second joint being adapted to vary the position of the cycle seat relative to the seat post and whereby the tilt of the seat to the cycle frame can be maintained in a selected orientation;

a transversely-extending upper termination adapted to be coupled to said upper end of the upper seat post extension with rotary bearing means adapted for relative rotation to said upper seat post extension disposed therebetween;

said rotary bearing means being adapted for dynamic rotation of the cycle seat while a rider is pedalling;

at least one damper comprising a cylindrical sleeve of polyurethane material having a longitudinally-extending opening disposed on said transversely-extending upper termination, with said transversely-extending upper termination received in said opening;

and at least one rail adapted to couple the cycle seat to the transversely-extending upper termination, so that the cycle seat is cantilevered to said transversely-extending upper termination, the said at least one rail being fixed at one end to the seat and having clamping means at another end adapted to clamp said at least one rail into engagement with an outer cylindrical surface of said at least one damper onto said transversely-extending upper termination, the clamping means being adapted to confine the damper and to prevent axial displacement and flow of the damper whereby static position of the cycle seat may be adjusted said static position being associated with a position of the seat where the seat is at rest in said selected orientation and wherein said at least one damper will respond to loads applied to the cycle seat so as to vary dynamic position of the cycle seat, said dynamic position being associated with a position of the seat where the seat has moved from said static position in response to a load, the damper being adapted to flex radially in response to a load and to return to a neutral position when the load is released, said neutral position being associated with a position of the damper where forces transmitted to the polyurethane material have been absorbed and released.

4. Coupling means for coupling a cycle seat cantilevered to a cycle frame, and having an adjustable tilt relative to the cycle frame, the coupling means comprising:

a seat post having a free, operatively lower end adapted to be coupled to a cycle frame;

an upper seat post extension having a free upper end adapted to be coupled to the cycle seat;

an intermediate seat post extension connecting the upper seat post extension to the seat post;

a first joint disposed between the intermediate seat post extension and the seat post, the first joint being adapted to vary the position of the cycle seat relative to the cycle frame;

a second joint disposed between the intermediate seat post extension and the upper seat post extension, the second joint being adapted to vary the position of the cycle seat relative to the seat post and whereby the tilt of the seat to the cycle frame can be adjusted to a selected orientation;

a transversely-extending upper termination adapted to be coupled to said upper end of the upper seat post extension;

at least one damper comprising a cylindrical sleeve of polyurethane material having a longitudinally-extending opening disposed on said transversely-extending upper termination, with said transversely-extending upper termination received in said opening;

and at least one rail adapted to couple the cycle seat to the transversely-extending upper termination, so that the cycle seat is cantilevered to said transversely-extending upper termination, the said at least one rail being fixed at one end to the seat and having clamping means at another end adapted to clamp said at least one rail into engagement with an outer cylindrical surface of said at least one damper onto said transversely-extending upper termination, the clamping means being adapted to confine the damper and to prevent axial displacement and flow of the damper whereby static position of the cycle seat may be adjusted said static position being associated with a position of the seat where the seat is at rest in said selected orientation and wherein said at least one damper will respond to loads applied to the cycle seat so as to vary dynamic position of the cycle seat, said dynamic position being associated with a position of the seat where the seat has moved from said static position in response to a load, the damper being adapted to flex radially in response to a load and to return to a neutral position when the load is released, said neutral position being associated with a position of the damper where forces transmitted to the polyurethane material have been absorbed and released.

* * * * *